March 1, 1932.    R. O. HELGEBY    1,848,061

SPEEDOMETER

Filed May 24, 1928

Inventor
Ralph O. Helgeby
By Blackmore, Spencer & Faik
Attorneys

Patented Mar. 1, 1932

1,848,061

UNITED STATES PATENT OFFICE

RALPH O. HELGEBY, OF FLINT, MICHIGAN, ASSIGNOR TO A C SPARK PLUG COMPANY, OF FLINT, MICHIGAN, A CORPORATION OF MICHIGAN

SPEEDOMETER

Application filed May 24, 1928. Serial No. 280,251.

This invention relates to measuring instruments and has been designed more particularly as an improvement in speedometers for use on vehicles.

An object of the invention is to improve the mechanism by which the movable members of the two parts of such an instrument—the speed indicator and the odometer—are both driven. More specifically, it is an object of the invention to utilize a flexible drive cable, having its end within the instrument and directly driving the rotor shaft. As a further object, the invention gives the desired angle of approach to the flexible drive shaft, providing maximum clearance in installation. Another object is to avoid short lengths of shafting between the rotor shaft of the instrument and the conventional flexible shaft. Other objects and advantages will be understood from a reading of the following description, and an examination of the accompanying drawings.

Figure 2:
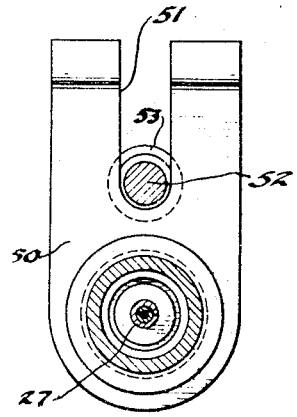
Figure 2 is a section on line 2—2 of Figure 1.

The instrument is of the type known as a magnetic speedometer and consists of a mechanically operated mileage recording odometer and a magnetically controlled speed indicating mechanism. Both are driven directly and simultaneously by a single flexible speedometer cable.

The combined instrument is housed in a casing 9. Within casing 9 is a main supporting frame 10. This frame is preferably formed by die casting and is held in position in the casing by means of a mounting plate 11 which is, in a suitable way not shown, secured to the frame 10 and removably attached to the casing.

The rotor shaft is journalled in a vertical bore of the die cast supporting frame 10 and is, itself, suitably bored and broached to receive a square terminal head 26 carried by the inner end of the flexible shaft 27. The lower end of the rotor shaft is flared to guide the terminal head 26 of shaft 27 in a manner which will be obvious from an inspection of Figure 1.

The driven member consists of the flexible cable 27 which is driven at one end by a suitable speedometer drive gear, not shown. At the instrument end the cable 27 enters and directly drives the rotor 25. The arrangement by which such a cable is operatively connected to the instrument to drive the combined units constitutes the principal subject matter of the present application. This arrangement will now be described in detail.

Figure 1:
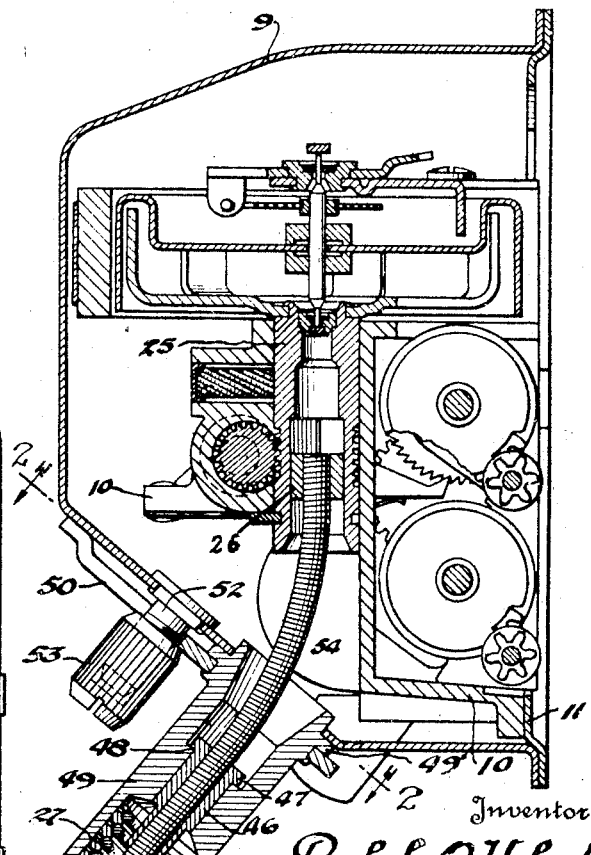
Figure 1 is a vertical section through the instrument with parts in elevation and parts broken away.
Figure 3:
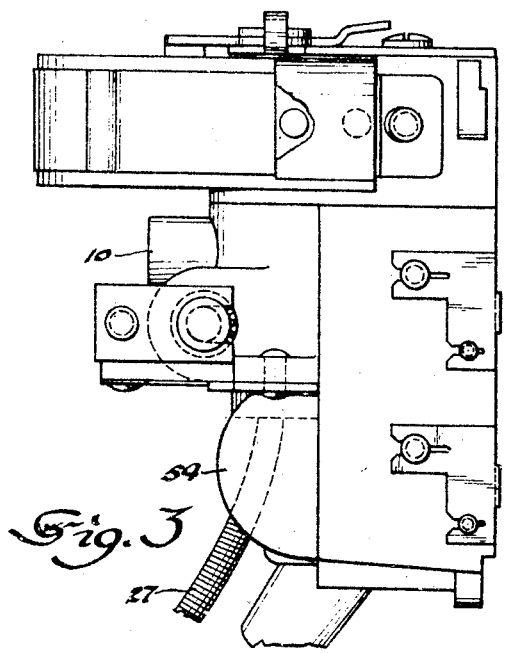
Figure 3 is a side elevation showing the main frame which supports the mechanism.

A non-circular, preferably square, driving head 26 is fixed to the inner end of cable 27. This head is designed to be slidably but non-rotatably mounted in a similarly shaped opening in the rotor shaft 25. The casing 9 is shaped at its rear wall, as shown in Figure 1, so that the cable leaving the instrument at right angles to said wall is directed away from the instrument board. It should be noted that the axis of the rotor shaft is vertical and angularly related to the casing wall referred to. This arrangement is accommodated by giving the end of the cable, the part within the casing, a slight angle or bend backwardly. A cable retainer 46 is fixedly mounted on the cable below the bend, to which reference has been made. The retainer 46 has a flanged head 47 which is to engage a shoulder 48 in the bore of a coupling or ferrule 49. As clearly shown in Figure 1, the retainer 46 is elongated and is rotatable within a bearing bore of the ferrule 49. The engagement of parts 47 and 48 retain the free end of cable 27 in proper relation with the rotor shaft 25, giving a smooth running condition and eliminating any tendency to cable whip in the angular drive between the ferrule bearing and the rotor shaft. The housing 56 for the flexible cable 27 terminates within and is secured to the outer end of coupling 49.

A clamping member 50 is secured in any suitable manner to the ferrule 49. Preferably, the ferrule has an annular flange 49' engaging the casing wall and the clamp 50 is secured to the coupling or ferrule just outside the flange. The clamp extends along but cut of contact with the casing wall, being inwardly bent and engaging the wall at its end. The end of the clamp is bifurcated forming a U-shaped slot 51, as at Figure 2. A screw-threaded bolt 52 suitably secured to the casing extends between the furcations of the slot and a fastening nut 53 may be threaded on the bolt and engage the clamp to secure it in position and thereby hold the ferrule 49 firmly in position.

The frame is provided with downwardly directed guide ears 54 cast thereon and located on either side of and below the opening into the rotor shaft, so that when the cable is directed into the opening in casing 9 the drive head 26 will be guided into engagement with shaft 25. Since the clamp 50 is secured to the ferrule 49 and also to the cable housing 56, a quick and easy yet positive connection can be made which is tightly held in place by nut 53.

In some earlier arrangements, the need of the bend in the cable has been recognized and such bent portions were located outside of and below the instrument. By this arrangement, the bend away from the vertical frequently brought the cable objectionably low and in the way of the knees of the occupants or the operating levers. In such arrangements, too, the clamp was not secured to the ferrule. By the present improvement, the bent portion of the cable is within the instrument and the cable is free from any sharp bends outside the instrument. This avoids the difficulties mentioned. Furthermore, the clamp is secured to the ferrule whereby the attachment is simplified. The cable leaves the instrument at a desired angle to give the maximum clearance and an easily attached and rigid arrangement is provided.

The drive head 26 floats freely in the rotor shaft, preventing any possible binding or cable whip and, a feature which is of much importance, the drive is taken directly from the main speedometer cable which is in one length, eliminating the short length of wire cable such as has frequently been used in the past. The ferrule 49 is of simpler design and, therefore, cheaper to manufacture than the parts corresponding thereto in prior constructions.

The invention described above in detail relates to the driving means for the mechanisms of the combined speedometer and odometer. It is not concerned with the specific details of these mechanisms themselves. For that reason more detailed descriptive matter of these mechanisms is omitted.

I claim:

1. In a measuring instrument, a rotor shaft therein, an enclosing casing for said instrument, said casing having a wall in a plane at an acute angle with the axis of said rotor shaft, a flexible drive shaft having one end in removable but driving engagement with said rotor shaft, said flexible shaft being curved from its position of engagement with said rotor shaft and extending through said wall in a direction substantially at right angles thereto, said flexible shaft being extended outside said casing from said wall whereby it may be connected to a source of drive.

2. The invention defined by claim 1, a ferrule secured to said wall, a sleeve fixed to said flexible shaft and rotatably mounted in said ferrule.

3. The invention defined by claim 1, a ferrule secured to said wall, a sleeve fixed to said flexible shaft and rotatably mounted in said ferrule, said sleeve and ferrule having interengaging parts to limit outward movement of said flexible shaft.

4. The invention defined by claim 1, said rotor shaft having a flared opening at its end to guide the end of the flexible shaft whereby assembly is facilitated.

In testimony whereof I affix my signature.

RALPH O. HELGEBY.